(12) United States Patent
Kim et al.

(10) Patent No.: US 8,046,431 B2
(45) Date of Patent: Oct. 25, 2011

(54) IP ADDRESS ASSIGNMENT METHOD AND APPARATUS FOR PROVIDING IP SERVICE IN A ZIGBEE NETWORK SYSTEM

(75) Inventors: Kwang-Jun Kim, Seoul (KR); Sung-Wook Kang, Seoul (KR); Jun-Young Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 112 days.

(21) Appl. No.: 12/240,386

(22) Filed: Sep. 29, 2008

(65) Prior Publication Data

US 2010/0082789 A1    Apr. 1, 2010

(30) Foreign Application Priority Data

Sep. 28, 2008    (KR) .......................... 10-2007-0097987

(51) Int. Cl.
*G06F 15/16* (2006.01)
(52) U.S. Cl. ........ 709/217; 709/203; 709/220; 709/227; 709/230; 709/244
(58) Field of Classification Search .................. 709/203, 709/217, 227, 244, 245, 220, 230
See application file for complete search history.

(56) References Cited

U.S. PATENT DOCUMENTS

| | | | |
|---|---|---|---|
| 6,549,516 B1* | 4/2003 | Albert et al. .................. 370/236 |
| 7,443,859 B2* | 10/2008 | Sengodan .................. 370/395.3 |
| 7,515,552 B2* | 4/2009 | Bhatti ........................... 370/254 |
| 7,672,289 B2* | 3/2010 | Bhatti ........................... 370/349 |
| 2002/0156917 A1* | 10/2002 | Nye ............................... 709/238 |
| 2006/0171352 A1* | 8/2006 | Seo et al. ....................... 370/328 |
| 2007/0030848 A1* | 2/2007 | Miyata et al. ................. 370/389 |
| 2007/0060143 A1* | 3/2007 | Bhatti ........................... 455/445 |
| 2007/0097993 A1* | 5/2007 | Bojahra et al. ............... 370/401 |
| 2007/0174477 A1* | 7/2007 | Bostick et al. ............... 709/231 |
| 2008/0056261 A1* | 3/2008 | Osborn et al. ............... 370/392 |
| 2008/0069121 A1* | 3/2008 | Adamson et al. ........... 370/401 |
| 2009/0006596 A1* | 1/2009 | Dinakaran et al. ........... 709/223 |
| 2009/0094349 A1* | 4/2009 | Smith ........................... 709/220 |
| 2010/0082789 A1* | 4/2010 | Kim et al. .................... 709/223 |

\* cited by examiner

*Primary Examiner* — Michael Won
(74) *Attorney, Agent, or Firm* — The Farrell Law Firm, P.C.

(57) ABSTRACT

A ZIGBEE® network system and a method for assigning an Internet Protocol (IP) address in a ZIGBEE® network system are provided. The ZIGBEE® network system includes a client device for joining a ZIGBEE® network and being assigned an IP address used for transmitting and receiving data; a server device for assigning the IP address to the client device; and a ZIGBEE® coordinator for forming the ZIGBEE® network, storing server profile information for each server device that has joined the formed ZIGBEE® network, receiving client profile information for the client device from the client device, and determining a server device that will assign an IP address to the client device, using the received client profile information.

27 Claims, 9 Drawing Sheets

IP ADDRESS ASSIGNMENT METHOD AND APPARATUS FOR PROVIDING IP SERVICE IN A ZIGBEE NETWORK SYSTEM

PRIORITY

This application claims priority under 35 U.S.C. §119(a) to a Korean Patent Application filed in the Korean Intellectual Property Office on Sep. 28, 2007 and assigned Serial No. 2007-97987, the disclosures of which are incorporated herein by reference.

BACKGROUND OF THE INVENTION

1. Field of the Invention

The present invention relates to a method and apparatus for assigning an Internet Protocol (IP) addresses to a client device to provide EP service in a ZIGBEE® network system.

2. Description of the Related Art

The ZIGBEE® communication scheme uses the IEEE 802.15.4 standard supporting short-range communication. ZIGBEE®, as used herein, refers to a specification for a suite of communication protocols for a Wireless Personal Area Network (WPAN). The term "ZIGBEE® communication scheme" refers to a technology for 10 to 20-meter short-range communication and ubiquitous computing in a wireless network environment such as home and office network environments. In particular, the ZIGBEE® communication scheme, a low-power communication scheme, can minimize power consumption, so power consumption can be suitable for devices including mobile communication terminals.

Recently, communication schemes have been proposed that support Internet Protocol (EP) service using the ZIGBEE® communication scheme. In the IP service, a mobile communication terminal is assigned an IP address, and can transmit/receive data using the IP address. A ZIGBEE® coordinator forming a ZIGBEE® network can include several servers in the network and provide IP service to the mobile communication terminals entering the ZIGBEE® network.

Therefore, there is a demand for a ZIGBEE® network system that can easily assign IP addresses to the mobile communication terminals receiving the IP service.

SUMMARY OF THE INVENTION

An aspect of the present invention is to address at least the problems and/or disadvantages and to provide at least the advantages described below. Accordingly, an aspect of the present invention is to provide a ZIGBEE® network system capable of easily assigning IP addresses, and a method for assigning IP addresses in a ZIGBEE® network system.

According to one aspect of the present invention, there is provided a ZIGBEE® network system including a client device for joining a ZIGBEE® network and being assigned an Internet Protocol (IP) address used for transmitting and receiving data; a server device for assigning the IP address to the client device; and a ZIGBEE® coordinator for forming the ZIGBEE® network, storing server profile information for each server device that has joined the formed ZIGBEE® network, receiving client profile information for the client device from the client device, and determining a server device that will assign an IP address to the client device, using the received client profile information.

According to another aspect of the present invention, there is provided a method for assigning an Internet Protocol (IP) address in a ZIGBEE® communication network system. The IP address assignment method includes receiving, by a ZIGBEE® coordinator forming a ZIGBEE® network, server profile information for a server device from the server device having at least one IP address, and registering the received server profile information in a previously stored server list; sending, by a client device, to the ZIGBEE® coordinator a request for a server address list including a ZIGBEE® address of each server device in order to access the server device; transmitting, by the ZIGBEE® coordinator, the requested server address list to the client device; receiving, by the client device, the transmitted server address list, and transmitting client profile information for the client to a desired server to request assignment of an IP address; and registering, by the server, the received client profile information in a previously stored client list, and assigning an IP address to the client.

According to further another aspect of the present invention, there is provided a method for approving a join of a ZIGBEE® device by a ZIGBEE® coordinator in a ZIGBEE® network system. The method includes receiving a join request from a ZIGBEE® device that has entered a ZIGBEE® network, and responding to the join request; sending a request for Service Discovery to the ZIGBEE® device, and receiving a Service Discovery response; detecting profile information for the ZIGBEE® device from the received Service Discovery response; determining whether the ZIGBEE® device is a server device using the detected profile information; and when the ZIGBEE® device is a server device, registering server profile information for the server device in a previously stored server list.

According to yet another aspect of the present invention, there is provided a method for transmitting server profile information to a client device by a ZIGBEE® coordinator in a ZIGBEE® network system. The transmission method includes receiving client profile information for a client device from the client device; receiving from the client device a request for transmission of a server address list including a ZIGBEE® address of each server; generating a server address list including ZIGBEE® addresses corresponding to server devices using a previously stored server list, and transmitting the server address list to the client device; receiving from the client a request for server profile information for a server device that the client intends to access; and transmitting the requested server profile information.

According to still another aspect of the present invention, there is provided a method for assigning an Internet Protocol (IP) address to a client device by a server device in a ZIGBEE® network system. The IP address assignment method includes receiving client profile information for a client device from the client device, and receiving a request for assignment of an IP address; determining an IP address to be assigned to the client device; and registering the received profile information in a previously stored client list, and assigning the determined IP address to the client device.

According to still another aspect of the present invention, there is provided a method for assigning an Internet Protocol (IP) address to a client device by a server device in a ZIGBEE® network system. The IP address assignment method includes receiving client profile information for a client device from the client device, and receiving a request for assignment of an IP address; determining whether an IP address included in the received client profile information is Null data; when the IP address included in the received client profile information is Null data, determining an arbitrary IP address to be assigned to the client device; and registering the received profile information in a previously stored client list, and assigning the determined IP address to the client device.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

Figure 1:
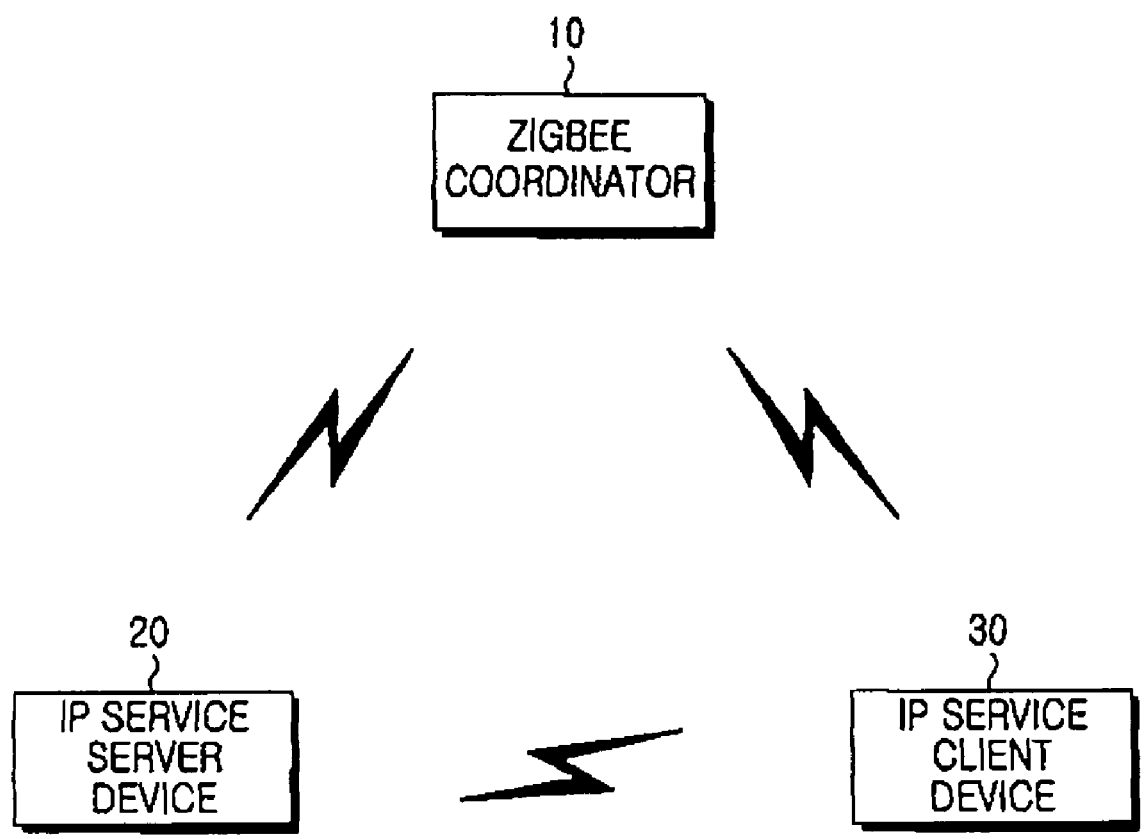
FIG. 1 is a diagram illustrating a ZIGBEE® network system according to an embodiment of the present invention.

FIG. 1 is a diagram illustrating a ZIGBEE® network system according to an embodiment of the present invention.

The ZIGBEE® network system according to an embodiment of the present invention includes a ZIGBEE® coordinator 10, an IP service server device 20, and an IP service client device 30.

For convenience's sake, the ZIGBEE® coordinator 10 will referred to as a 'coordinator 10', the IP service server device 20 as a 'server 20', and the IP service client device 30 as a 'client 30'.

The coordinator 10 forms a ZIGBEE® network. Generally, only one coordinator 10 can exist in the ZIGBEE® network. The coordinator 10 stores a server list, which is a list of servers 20 joining the corresponding ZIGBEE® network. In addition, the coordinator 10 stores server profile information, which is profile information for the servers 20. Upon receiving a request for a server address list from the client 30, the coordinator 10 extracts ZIGBEE® addresses of the servers 20 from the server profile information to generate a server address list, and transmits the generated server address list to the client 30.

The server profile information includes at least one of a Personal Area Network IDentifier (PAN ID), a ZIGBEE® address, an IP address, a Device Mode, a Timer Handle, and an Expire Tune for each server 20.

The server 20 assigns an IP address to the client 30 to provide EP service to the client 30. The server 20 sends a join request to the ZIGBEE® network that the coordinator 10 forms, and registers the server profile information in a server list of the coordinator 10 through a Service Discovery process.

Upon receipt of an IP address assignment request from the client 30, the server 20 determines if it can assign an IP address using client profile information, which is profile information for the client 30. The server 20 assigns an IP address to the client 30 when the server 20 can assign an IP address, and rejects the assignment of an IP address when the server 20 cannot assign an IF address.

Even the client profile information, like the server profile information, includes at least one of a PAN ID, a ZIGBEE® address, an IP address, a Device Mode, a Timer Handle, and an Expire Time for each client 30.

Meanwhile, the server 20 can be included in the ZIGBEE® coordinator 10, and the ZIGBEE® coordinator 10 can serve as the server 20.

The client 30 enters the ZIGBEE® network formed by the coordinator 10 and sends a join approve request to the coordinator 10. When a join request of the coordinator 10 is approved, the client 30 accesses one of the servers 20 registered in the server list previously stored in the coordinator 10, and makes a request for assignment of an IP address. Upon receiving an assigned IP address from the server 20, the client 30 performs a transaction of, for example, transmitting/receiving data, using the assigned IP address.

Figure 2:
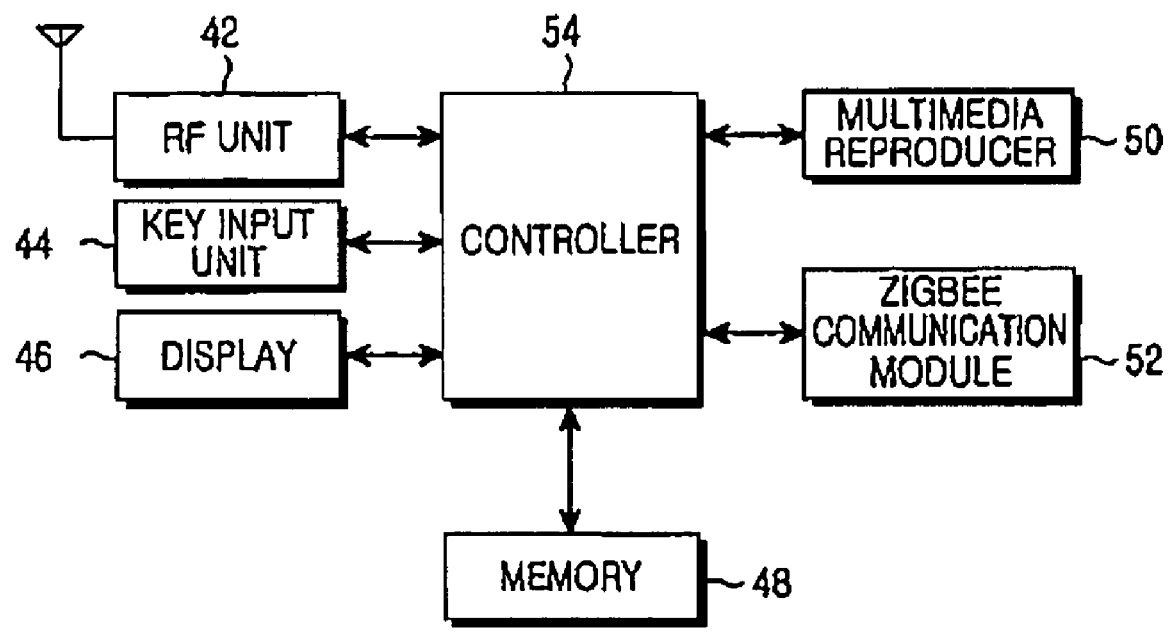
FIG. 2 is a diagram illustrating a schematic structure of a mobile communication terminal in a ZIGBEE® network system according to an embodiment of the present invention.

FIG. 2 is a diagram illustrating a schematic structure of a mobile communication terminal in a ZIGBEE® network system according to an embodiment of the present invention.

The mobile communication terminal according to an embodiment of the present invention can serve as the client 30 in the ZIGBEE® network system. The mobile communication terminal includes a Radio Frequency (RF) unit 42, a key input unit 44, a display 46, a memory 48, a multimedia reproducer 50, a ZIGBEE® communication module 52, and a controller 54.

The RF unit 42 performs a wireless communication function of the mobile communication terminal. The RF unit 42 includes an RF transmitter (not shown) for frequency-up-converting and amplifying transmission signals, and an RF receiver (not shown) for low-noise-amplifying and frequency-down-converting received signals.

The key input unit 44 receives input from the user and includes keys by which the key input unit 44 can receive numerals and characters, and keys used for setting various functions. When the mobile communication terminal enters the ZIGBEE® network, the key input unit 44 according to an embodiment of the present invention can receive a user input indicating whether the mobile communication terminal will be assigned an IP address.

The display 46, which can be composed of a Liquid Crystal Display (LCD), outputs various display data generated by the mobile communication terminal. When the LCD is a touch-screen, the display 46 can also serve as an input means. When the mobile communication terminal is assigned an IP address from the server 20, the display 46 according to an embodiment of the present invention can display an indication the possibility of performing transactions using the IP address.

The memory 48 can consist of a program memory and a data memory. The memory 48 stores therein a variety of information necessary for controlling an operation of the mobile communication terminal. The memory 48 according to an embodiment of the present invention stores client profile information for the mobile communication terminal. The memory 48 also stores a server address list and server profile information of the server 20, which are received from the coordinator 10.

The multimedia reproducer 50 reproduces the multimedia data stored in the memory 48 or the multimedia data received via the RF unit 42.

The ZIGBEE® communication module 52 performs ZIGBEE® communication in the ZIGBEE® network. The ZIGBEE® communication module 52 of the mobile communication terminal serving as the client 30, sends a join request to the coordinator 10, and receives a server address list from the coordinator 10. Further, the ZIGBEE® communication module 52 transmits client profile information to the server 20, and is assigned an IP address from the server 20.

The controller 54 controls the entire operation of the mobile communication terminal. The controller 54 controls the ZIGBEE® communication module 52 to send a join request to the coordinator 10 and to receive a server address list from the coordinator 10. Further, the controller 54 controls the ZIGBEE® communication module 52 so that the ZIGBEE® communication module 52 is assigned an IP address necessary for performing transactions of, for example, transmitting and receiving to/from the server 20 accessed by the ZIGBEE® communication module 52.

In addition, according to an embodiment of the present invention, the mobile communication terminal can operate as a ZIGBEE® coordinator. When the mobile communication terminal operates as a ZIGBEE® coordinator, the mobile communication terminal includes memory and a controller, and the memory 48 stores a server list, which is a list of server devices that have joined the ZIGBEE® network, server profile information for the server devices, and a server address list including ZIGBEE® addresses of the server devices. The controller 54 forms a ZIGBEE® network using the ZIGBEE® communication module 52, receives, from a server device having at least one IP address, server profile information including server address information for the server device, registers the received server profile information in a previously stored server list, receives, from a client device, a request for a server address list including ZIGBEE® addresses of the server devices, and transmits the requested server address list to the client device.

Further, according to an embodiment of the present invention, the mobile communication terminal can operate as a server device. When the mobile communication terminal operates as a server device, the mobile communication terminal includes memory and a controller, and the memory 48 stores its own server profile information and client profile information for a client device requesting assignment of an IP address. The controller 54 receives, from a client device requesting assignment of an IP address, client profile information for the client device, determines an IP address to be assigned to the client device using the received client profile information, records the client profile information in a previously stored client list, and assigns the determined IP address to the client device.

Figure 3:
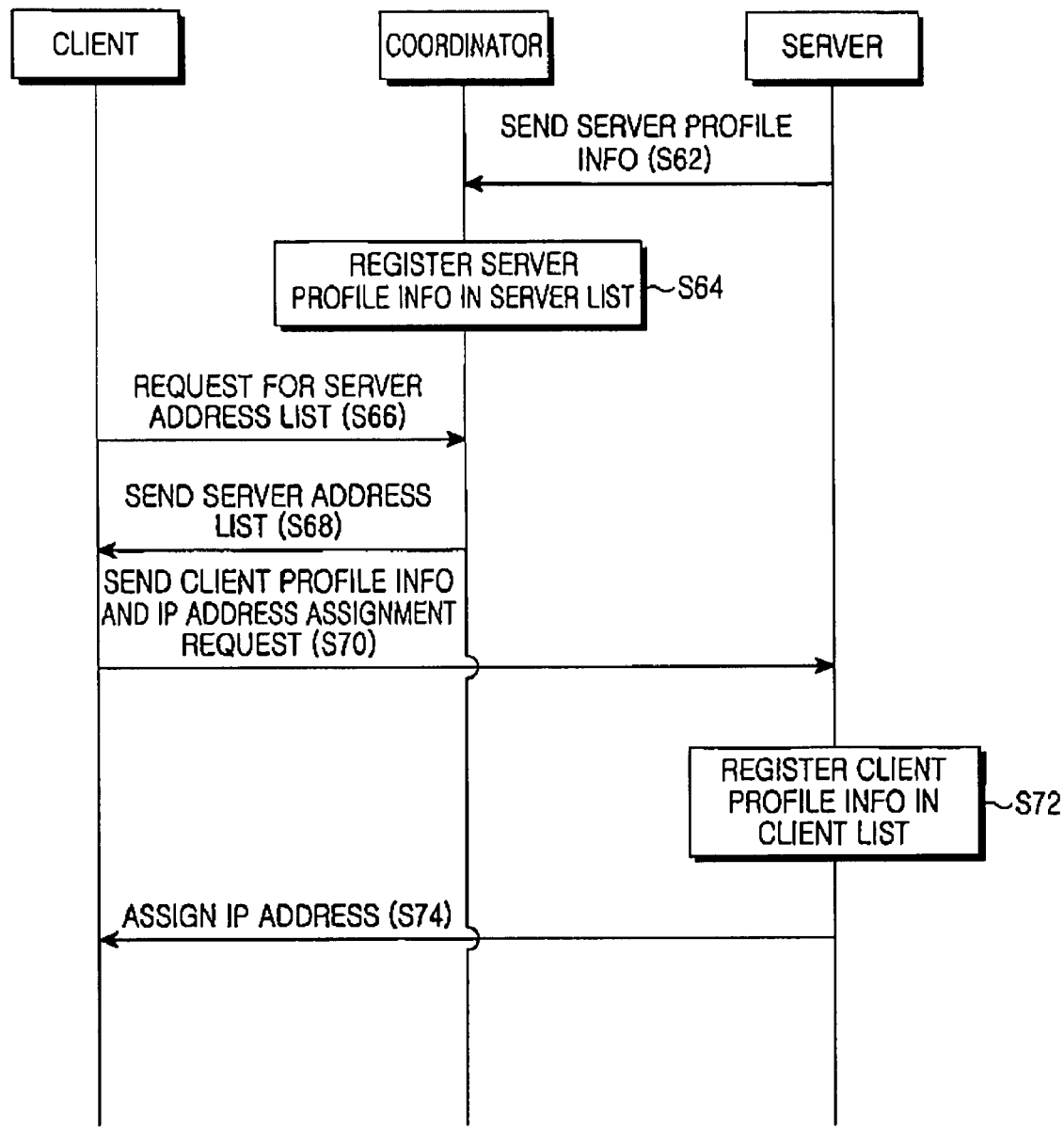
FIG. 3 is a flowchart illustrating a method for assigning an IP address in a ZIGBEE® network system according to an embodiment of the present invention.

FIG. 3 is a flowchart illustrating a method for assigning an IP address in a ZIGBEE® network system according to an embodiment of the present invention.

The server 20 transmits server profile information to the coordinator 10 (Step S62). The server profile information, profile information for the server 20, includes at least one of PAN ID, ZIGBEE® address, IP address, Device Mode, Timer Handle and Expire Time.

Herein, 'Device Mode' is information indicating whether the device joining the ZIGBEE® network formed by the coordinator 10 serves as any one of the server 20 and client 30. The server 20 keeps a server mode, and the client 30 keeps a client mode. 'Timer Handle' is information regarding the timer indicating the valid time for which the server 20 or the client 30 lasts in the ZIGBEE® network, and this information indicates to which server 20 or client 30 the timer corresponds. 'Expire Time' indicates the time at which the timer expires.

Upon receipt of the server profile information from the server 20, the coordinator 10 registers the server profile information in a server list, in Step S64. When the server profile information is registered in the server list stored by the coordinator 10, the server 20 can assign an IP address to the client 30 that accesses the server 20 in the ZIGBEE® network formed by the coordinator 10. The coordinator 10 manages servers 20 of the ZIGBEE® network by registering or deleting (deregistering), from the server list, the server profile information for the server 20 joining the ZIGBEE® network.

To be assigned an IP address, the client 30 sends a request for a server address list to the coordinator 10, in Step S66. The server address list is a list of ZIGBEE® addresses corresponding to the servers 20 existing in the ZIGBEE® network formed by the coordinator 10. The ZIGBEE® address can be a unique address value that each server 20 or client 30 has in the ZIGBEE® network. The coordinator 10 receives the server profile information from each server 20, extracts a ZIGBEE® address associated with each server 20 using the received server profile information, and generates and stores a server address list.

Upon receiving the request for a server address list from the client 30, the coordinator 10 sends a server address list to the client 30, in Step S68. Upon receiving the server address list, the client 30 can detect a ZIGBEE® address of the server 20 that it intends to access, among the servers 20 included in the server address list.

The client 30 transmits client profile information of the client 30 to the server 20 that the client 30 intends to access, and sends a request for assignment of an IP address, in Step S70. The client profile information indicates profile information for the client 30. Even the client profile information, like the server profile information, can include at least one of a PAN ID, a ZIGBEE® address, an IP address, a Device Mode, a Timer Handle, and an Expire Time.

The server 20 registers the client profile information in the previously stored client list, in Step S72. The server 20, like the coordinator 10, can manage the clients 30 accessing the server 20, by registering the client profile information in the client list.

The server 20 assigns an IP address to the client 30 (Step S74). As a result, the client 30 can perform transactions of, for example, transmitting/receiving data in the ZIGBEE® network.

Figure 4:
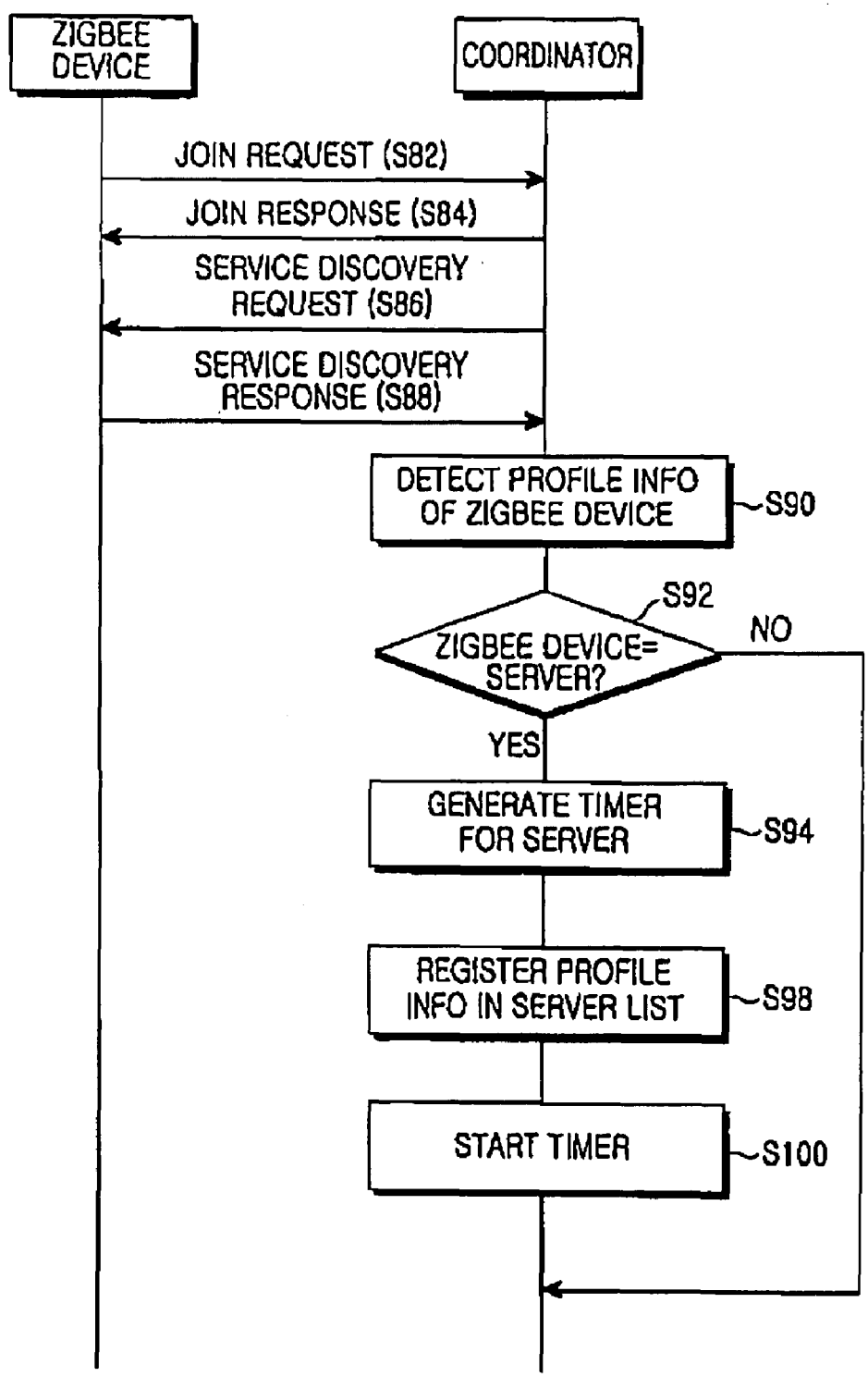
FIG. 4 is a flowchart illustrating a method for joining a ZIGBEE® network by a ZIGBEE® device in a ZIGBEE® network system according to an embodiment of the present invention.

FIG. 4 is a flowchart illustrating a method for joining a ZIGBEE® network by a ZIGBEE® device in a ZIGBEE® network system according to an embodiment of the present invention.

The ZIGBEE® device entering the ZIGBEE® network formed by the coordinator 10 sends a join request to the coordinator 10, in Step S82. The coordinator 10 sends a join response to the join-requesting device, in Step S84 to approve the join request of the ZIGBEE® device.

The coordinator 10 makes a request for Service Discovery of the ZIGBEE® device, in Step S86. The Service Discovery of the coordinator 10 is a process for determining whether the ZIGBEE® device joining the ZIGBEE® network is a server 20 or a client 30. In Step S86, the coordinator 10 sends to the ZIGBEE® device a request for information regarding the ZIGBEE® device including profile information.

The ZIGBEE® device sends a Service Discovery response to the coordinator 10, in Step S88, and the coordinator 10 detects profile information of the ZIGBEE® device from the Service Discovery response, in Step S90. Based on the detected profile information, the coordinator 10 can determine whether the device joining the ZIGBEE® network is a client 30 or a server 20.

The coordinator 10 determines whether the joining ZIGBEE® device is a server 20, in Step S92. If, at Step S92, it is determined that the joining device is not the server 20, the coordinator 10 performs no separate operation. However, if the ZIGBEE® device is a server 20, the coordinator 10 generates a timer for the server 20, in Step S94. The timer generated by the coordinator 10 is for checking whether the server 20 operates in the ZIGBEE® network. While the timer generated by the coordinator 10 runs, the server 20 associated with the timer is valid in the ZIGBEE® network. Preferably, the coordinator 10 registers information regarding the timer in the server profile information received from the server 20.

The coordinator 10 registers the server profile information for the server 20 in a server list, in Step S98, and starts the timer, in Step S100. As a result, the ZIGBEE® device determined as a server 20 can provide, in the ZIGBEE® network, IP service of, for example, assigning an IP address to the client 30.

Figure 5:
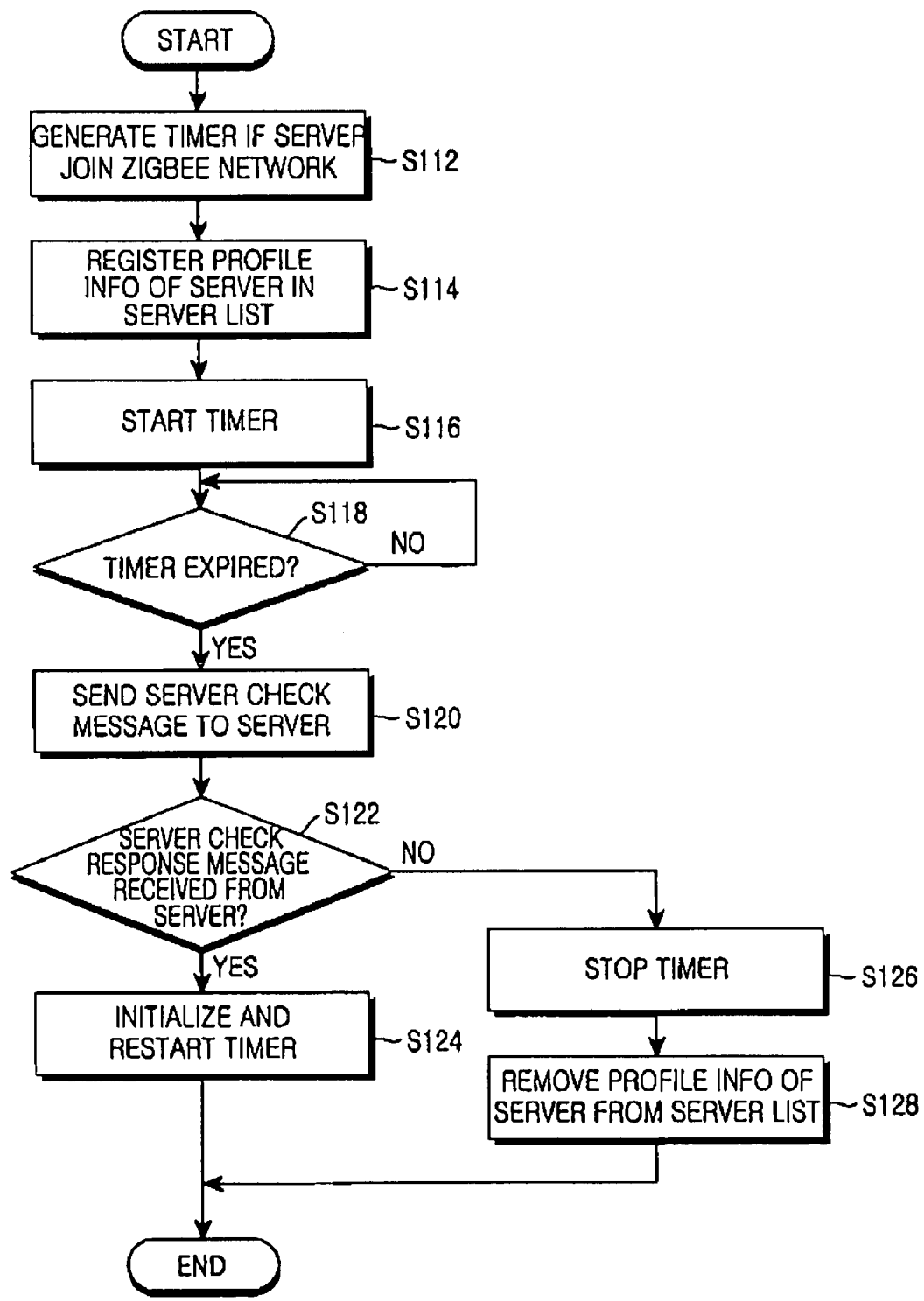
FIG. 5 is a flowchart illustrating a method for determining validity of a server using a timer by a coordinator in a ZIGBEE® network system according to an embodiment of the present invention.

FIG. 5 is a flowchart illustrating a method for determining validity of a server using a timer by a coordinator in a ZIGBEE® network system according to an embodiment of the present invention.

When the server 20 joins the ZIGBEE® network, the coordinator 10 generates a timer, in Step S112. Additionally, the coordinator 10 registers profile information of the joining server 20 in a server list, in Step S114, and starts a timer, in Step S116.

The coordinator 10 determines whether the timer has expired, in Step S118. If it is determined that the timer has not expired, in Step S118, the coordinator 10 continues to activate the timer. However, if the timer has expired, the coordinator 10 sends a server check message to the server 20, in Step S120. The coordinator 10 sends the server check message in order to check if the timer-expired server 20 has joined the ZIGBEE® network. Upon failure to receive a response message from the server 20 in response to the server check message sent by the coordinator 10, the coordinator 10 can determine that the server 20 has not joined the ZIGBEE® network.

The coordinator 10 determines whether the coordinator 10 has received a server check response message from the server 20, in Step S122. If it is determined that the coordinator 10 has received the server check response message, in Step S122, the coordinator 10 initializes and restarts the timer, in Step S124. Since the server check response message is received, the server 20 has been joining the ZIGBEE® network. Therefore, the coordinator 10 initializes the timer associated with the server 20 so that the server 20 can continue to provide the IP service.

Upon determination of a failure to receive the server check response message in Step S122, the coordinator 10 stops the timer, in Step S126. Upon failure to receive the server check response message, the coordinator 10 determines that the server 20 has left the ZIGBEE® network. Therefore, the coordinator 10 removes the server profile information corresponding to the server 20 from the server list, in Step S128. The server list of the coordinator 10 is a list used for registering only the servers 20 that perform an operation of providing IP service to the client 30 in the ZIGBEE® network. The coordinator 10 can manage the servers 20 joining the ZIGBEE® network, by removing the profile information from the server list.

Figure 6:
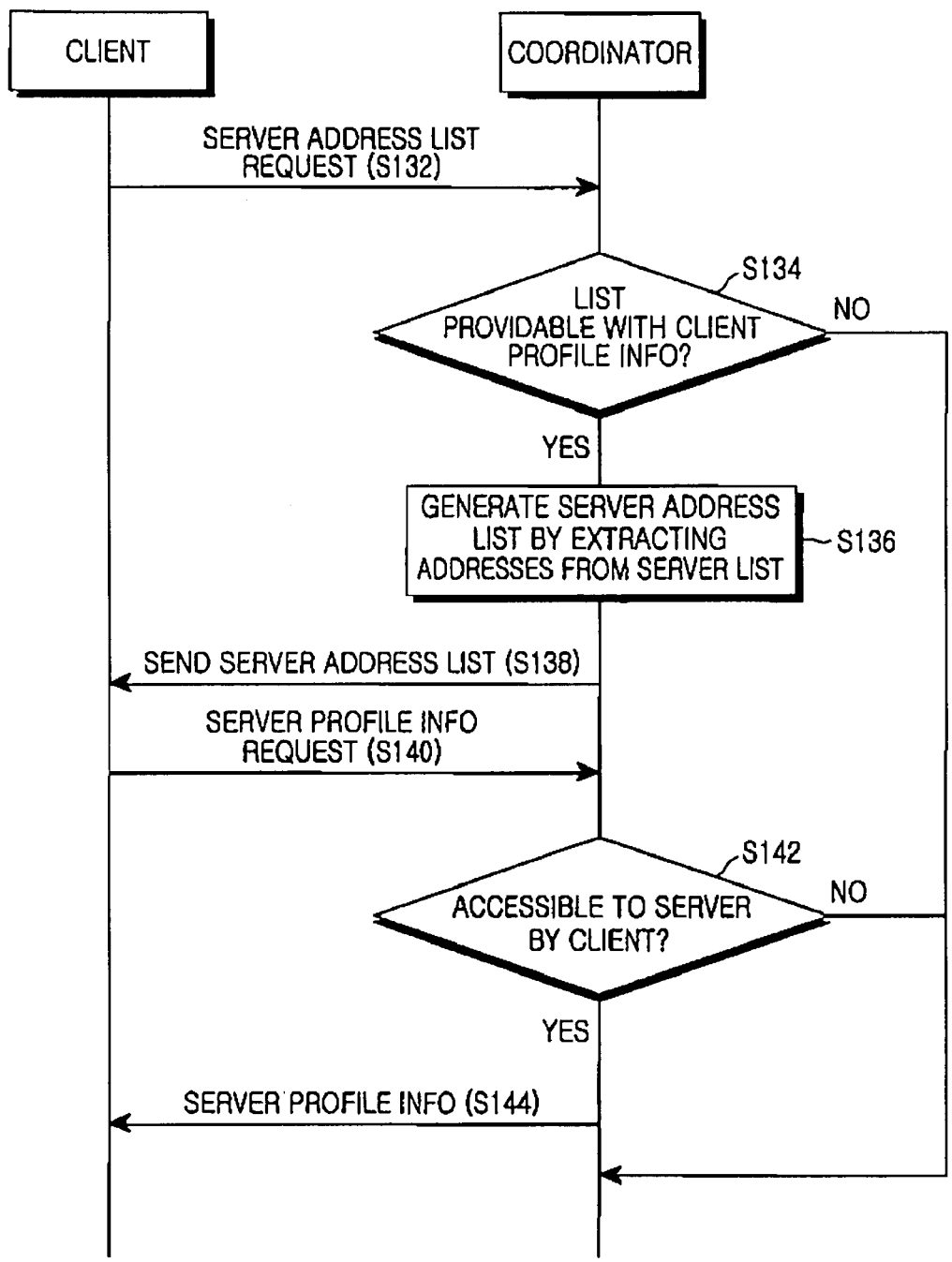
FIG. 6 is a flowchart illustrating a method for joining by a client in a ZIGBEE® network system according to an embodiment of the present invention.

FIG. 6 is a flowchart illustrating a method for joining, by a client, a ZIGBEE® network system according to an embodiment of the present invention.

The client 30 that has joined the ZIGBEE® network sends a transmission request for a server address list to the coordinator 10, in Step S132. In order to receive a server address list, the client 30 sends its client profile information to the coordinator 10.

The coordinator 10 determines whether the coordinator 10 can provide a server address list using the client profile information of the client 30, in Step S134. The coordinator 10 should determine whether a communication type of the client 30 is a virtual socket type or an IP type using the client profile information, to determine the servers 20 suitable for a communication scheme of the client 30. Therefore, the coordinator 10 determines whether each of the servers 20 is communicable with the client 30. The coordinator 10 can separately make a server address list including only the servers 20 communicable with the client 30, and send the server address list to the client 30.

In addition, based on the client profile information, the coordinator 10 can determine whether the client 30 that has joined the ZIGBEE® network is a proper user. For example, if the service provided by the ZIGBEE® network system is a paid service, the coordinator 10 can determine whether the client 30 that has joined the ZIGBEE® network is a proper user, using the client profile information.

If it is determined in Step S134 that it is not possible to provide a server address list to the client 30, the coordinator 10 ends the operation without providing the server address list to the client 30.

However, if it is determined in Step S134 that it is possible to provide a server address list to the client 30, in Step S134, the coordinator 10 extracts ZIGBEE® addresses of servers 20 from the server profile information registered in the server list, and generates a server address list, in Step S136. The coordinator 10 sends the generated server address list to the client 30, Step S138, and the client 30 determines any one of the servers 20 included in the server address list as the server 20 to which client 30 will access.

The client 30 sends, to the coordinator 10, a request for server profile information for the server 20 to which the client intends to access, in Step S140. In this case, the client 30 can transmit, to the coordinator 10, a ZIGBEE® address of the server 20 to which the client 30 intends to access among the servers 20 included in the server address list, to allow the coordinator 10 to notify the server 20 to which the client 30 intends to access.

Upon receipt of the server profile information request from the client 30, the coordinator 10 determines whether the client 30 is accessible to the corresponding server 20, in Step S142. The access to the server 20 by the client 30 is impossible, for example, when the IP address of the server 20 that the client 30 intends to access is different. Even when the server 20 leaves the ZIGBEE® network, the client 30 cannot access the server 20. In addition, even when Expire Time of the client profile information has already elapsed, the server 20 assigns no IP address to the client 30. Even when the server 20 does not support the IP service, the access is impossible.

The coordinator 10 previously checks the state of the server 20, and notifies the client 30 whether the client 30 can access the corresponding server 20.

If it is determined in Step S142 that the client 30 cannot access the server 20, the coordinator 10 ends the operation after notifying that the client 30 cannot access the server 20.

However, if it is determined in Step S142 that the client 30 can access the server 20, the coordinator 10 transmits server profile information for the corresponding server 20 to the client 30, in Step S144. Then the client 30 can access the server 20 using the server profile information.

Figure 7:
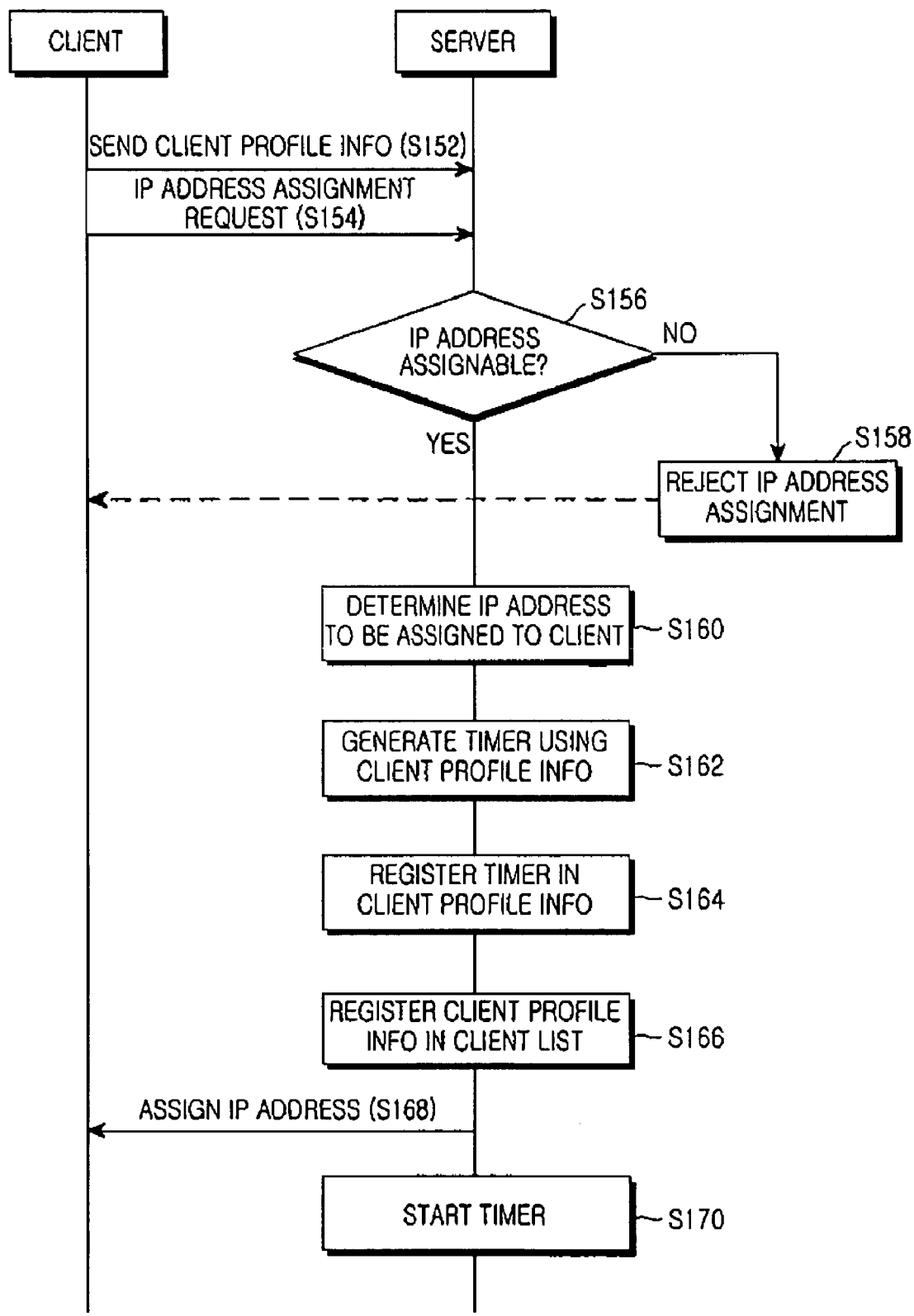
FIG. 7 is a flowchart illustrating a method for assigning an IP address to a client by a server in a ZIGBEE® network system according to an embodiment of the present invention.

FIG. 7 is a flowchart illustrating a method for assigning an IP address to a client by a server in a ZIGBEE® network system according to an embodiment of the present invention.

The client 30 generates a timer using Expire Tune information in the previously stored client profile information. The client 30 transmits the client profile information to the server 20, in Step S152, and sends a request for an IP address assignment, in Step S154. Upon receiving the request from the client 30, the server 20 determines whether the IP address assignment is possible, in Step S156. If it is determined that the IP address assignment is not possible, in Step S156, the server 20 rejects the assignment of an IP address, in Step S158. In this case, the server 20 can delete the client profile information received in Step S152 from the client 30.

If it is determined in Step S156 that the IP address assignment is possible, the server 20 determines an IP address it will assign to the client 30, in Step S160. The server 20 generates a timer using the client profile information received in Step S152 from the client 30, in Step S162. The timer generated in Step S162 includes a valid time for which the client 30 that has accessed the server 20 can perform transaction using the IP address.

The server 20 registers a timer in the client profile information received from the client 30, in Step S164.

The server 20 registers the client profile information in a client list, in Step S166. The server 20 stores and manages the client list in which the server 20 registered the client profile information for each of the clients 30 that have accessed the server 20. Based on the client list, the server 20 can detect the clients 30 that have accessed the server 20.

The server 20 assigns an IP address to the client 30, in Step S168, and starts the timer, in Step S170. As a result, the client 30 that has accessed the server 20 can achieve transaction using the IP address assigned from the server 20.

Figure 8:
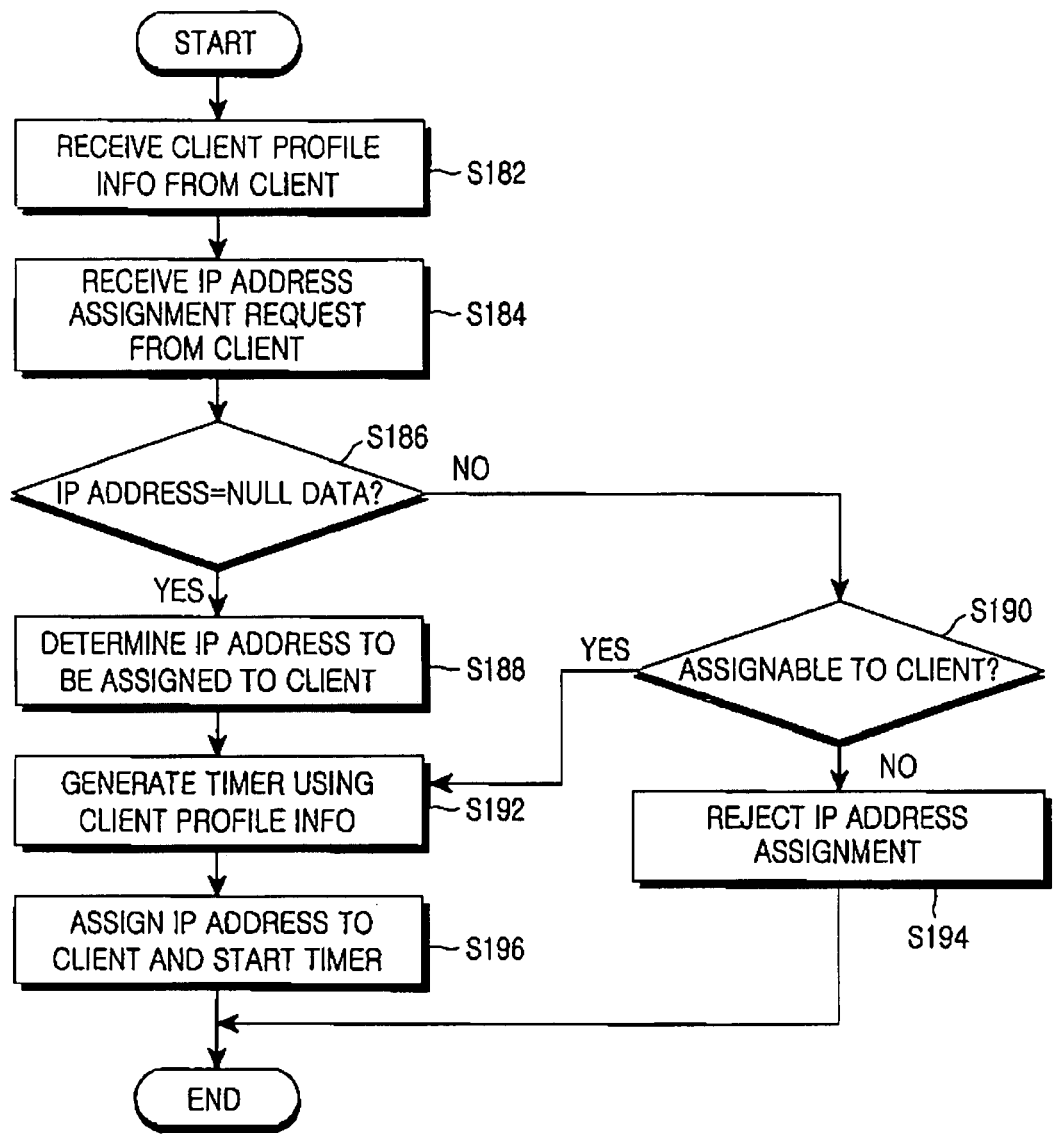
FIG. 8 is a flowchart illustrating a method for assigning an IP address to a client by a server in a ZIGBEE® network system according to an embodiment of the present invention.

FIG. 8 is a flowchart illustrating a method for assigning an IP address to a client by a server in a ZIGBEE® network system according to an embodiment of the present invention.

The server 20 receives client profile information from the client 30 that has made access thereto, in Step S182. In addition, the server 20 receives an assignment request for an IP address from the client 30, in Step S184.

The server 20 determines whether an IP address of the client profile information is Null data, in Step S186. If the IP address of the client profile information is Null data, the server 20 can arbitrarily assign an IP address. However, when the IP address is designated as a particular IP address, the client 30 cannot perform transaction unless it uses the corresponding IP address.

When it is determined that the IP address of the client profile information is Null data, in Step S186, the server 20 determines an IP address that the server 20 will assign to the client 30, in Step S188. If the IP address of the client profile information is Null data, the operation that the client 30 intends to perform by accessing the server 20 is not an operation requiring a particular IP address. Therefore, the server 20 can assign any one of the available IP addresses of the server 20 to the client 30.

Thereafter, the server 20 generates a timer using the client profile information, in Step S192. The server 20 assigns an IP address to the client 30 and starts the timer, in Step S196.

If it is determined in Step S186 that the IP address of the client profile information is not Null data, in Step S186, the server 20 determines whether the server 20 can assign an IP address registered in the client profile information to the client 30, in Step S190. The client 30 cannot perform the desired operation of the client 30 in the server 20 unless the client 30 is assigned an IP address registered in the client profile information. When another client has already assigned the IP address requested by the client 30, or the server 20 does not have the IP address registered in the client profile information, the server 20 cannot assign an IP address to the client 30.

If it is determined in Step S190 that the server 20 cannot assign an IP address of the client profile information to the client 30, in Step S190, the server 20 sends a rejection for IP address assignment to the client 30, in Step S194.

However, if it is determined in Step S190 that the server 20 can assign an IP address of the client profile information to the client 30, in Step S190, the server 20 generates a timer using the client profile information, in Step S192. The server 20 assigns an IP address to the client 30, and starts the timer, in Step S196.

Figure 9:
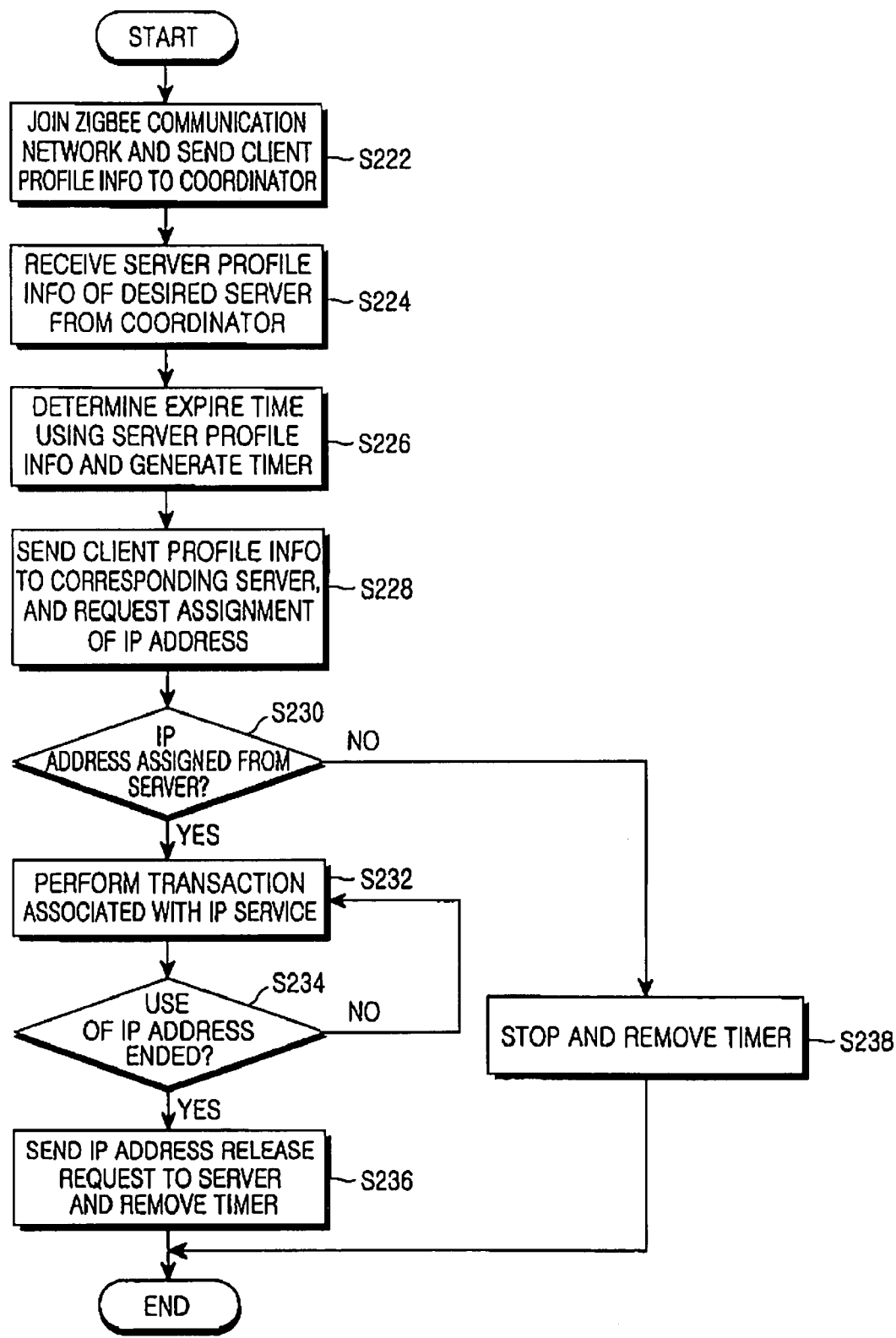
FIG. 9 is a flowchart illustrating a method in which a client is assigned an IP address in a ZIGBEE® network system according to an embodiment of the present invention.

FIG. 9 is a flowchart illustrating a method in which a client is assigned an IP address in a ZIGBEE® network system according to an embodiment of the present invention.

The client 30 joins the ZIGBEE® communication and transmits its client profile information to the coordinator 10, in Step S222. The client 30 receives server profile information for the server 20 to which the client 30 intends to access, from the coordinator 10, in Step S224. Upon receiving the server profile information, the client 30 determines an Expire Time and generates a timer, in Step S226.

Since the server profile information includes Expire Time information therein, the client 30 can generate a timer for allotting a time valid in the server 20 depending on the Expire Time information in the server profile information, i.e., the client 30 accesses the server 20 using the server profile information and determines a time for which data transmission/reception, including assignment of an IP address, is available. Therefore, when the timer expires, the client 30 cannot perform transaction in the server 20.

The client 30 transmits the client profile information to the corresponding server 20, and sends a request for assignment of an IP address, in Step S228.

The client 30 determines whether the client 30 is assigned an IP address from the server 20, in Step S230. When the client 30 is not assigned an IP address, in Step S230, i.e., if the client 30 has received a rejection for IP address assignment from the server 20, the client 30, in Step S238, stops and deletes the timer generated in Step S226. Thereafter, the client 30 performs no further operations on the server 20.

However, if it is determined in Step S230 that the client 39 is assigned an IP address from the server 20, in Step S230, the client 30 performs transaction associated with the IP service using the assigned IP address, in Step S232. The client 30 determines whether use of the IP address by the client 30 has ended, in Step S234. In this case, the client 30 can determine the completed use of the IP address by determining whether the timer generated in Step S226 has expired. It is assumed in this embodiment that when the timer has not expired, the client 30 ends use of the IP address by the client 30 by making a request.

When it is determined that the use of the IP address has ended, in Step S234, the client 30 sends an IP address release request to the server 20, and removes the timer, in Step S236. However, when it is determined that the use of the IP address has not ended, in Step S234, the client 30 continues to perform transaction associated with the IP service, in Step S232. In this case, even the timer generated by the client 30 in Step S226 should also continue operating.

As is apparent from the foregoing description, the present invention provides a ZIGBEE® network system capable of easily assigning an IP address, and a method for assigning an IP address in a ZIGBEE® network system.

According to the present invention, the ZIGBEE® coordinator registers and manages a server list including server profile information for each IP service server device, making it possible to easily manage the IP service server devices joining the ZIGBEE® network.

Further, the ZIGBEE® coordinator transmits the server list to the IP service client devices joining the ZIGBEE® network to allow the IP service client devices to select a proper server, so that the IP service client devices can be easily assigned an IP address.

In addition, the ZIGBEE® coordinator transmits server profile information for the IP service server devices to the UP service client devices so that the IP service client devices can easily access their desired IP service server devices.

Moreover, the IP service server device receives the client profile information from the IP service client device that has accessed the IP service server device, so that it can determine the IP address desired by the IP service client device and assign the desired IP address.

Further, the IP service server device receives the client profile information from the IP service client device that has accessed the IP service server device, and registers the received client profile information in the client list, making it possible to easily manage the IP service client device that has made access thereto.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An Internet Protocol (IP) address assignment method performed by a client device in a ZIGBEE® specification-compliant network including a ZIGBEE® specification-compliant coordinator, a plurality of client devices, and at least one server, in which each of the client devices is assigned an IP address, the method comprising:
   receiving from the ZIGBEE® specification-compliant coordinator a server address having a server-unique address value corresponding to the at least one server;
   selecting one of the at least one server according to the received server address;
   generating profile information of the client device; and
   sending the generated profile information and an IP address request message to the selected server, and receiving an IP address assigned for performing communication with the ZIGBEE® specification-compliant coordinator.

2. The IP address assignment method of claim 1, wherein the server-unique address value of the server address is assigned by the ZIGBEE® specification-compliant coordinator constituting the ZIGBEE® network.

3. The IP address assignment method of claim 1, wherein the profile information of the client device comprises at least one of a Personal Area Network IDentifier (PAN ID), a ZIGBEE® specification-compliant address, an IP address, a Device Mode, a Timer Handle, and an Expire Time.

4. The IP address assignment method of claim 3, wherein the Device Mode indicates whether a device constituting the ZIGBEE® specification-compliant network is a server or a client device.

5. The IP address assignment method of claim 1, wherein the server address is generated by the ZIGBEE® specification-compliant coordinator using server profile information received from the server.

6. The IP address assignment method of claim 1, further comprising:
   receiving, by the server, profile information of the client device and an IP address request message from the client device;
   registering the received client profile information;
   determining whether the client device requesting the IP address is available; and
   generating an IP address according to a result of the determination.

7. A method for assigning an Internet Protocol (IP) address by a ZIGBEE® specification-compliant coordinator in a ZIGBEE® specification-compliant network including the ZIGBEE® specification-compliant coordinator, a plurality of client devices, and at least one server device, the method comprising:
   receiving, from a server device having at least one IP address, server profile information including server address information for the server device, and registering the received server profile information in a previously stored server list;
   receiving, from a client device, a request for a server address list including a ZIGBEE® specification-compliant address of each server device; and
   transmitting the requested server address list to the client device.

8. The method of claim 7, further comprising:
   receiving, from the client device, a request for server profile information for a server device that the client device intends to access; and
   transmitting the requested server profile information.

9. The method of claim 7, wherein transmitting the requested server address list comprises:
   determining whether it is possible to provide the server address list to the client device using the received client profile information; and
   when it is possible to provide the server address list, generating the server address list including ZIGBEE® specification-compliant addresses corresponding to each server device, and transmitting the generated server address list to the client device.

10. The method of claim 7, wherein the server profile information comprises at least one of a Personal Area Network IDentifier (PAN ID), a ZIGBEE® specification-compliant address, an IP address, a Device Mode, a Timer Handle and an Expire Time for the server device, and the client profile information comprises at least one of a PAN ID, a ZIGBEE® specification-compliant address, an IP address, a Device Mode, a Timer Handle and an Expire Time for the client device.

11. The method of claim 7, further comprising:
  storing, in the server list, server profile information of a server device that has joined the ZIGBEE® specification-compliant coordinator.

12. The method of claim 11, wherein storing server profile information in the server list comprises:
  generating a timer for the joined server device;
  transmitting information on the timer to the server device along with the server profile information; and
  registering the transmitted server profile information in the server list.

13. The method of claim 12, further comprising:
  upon receiving a response message to a server check message from the server device, initializing and restarting the timer.

14. A method for assigning an Internet Protocol (IP) address to a client device by a server device in a ZIGBEE® specification-compliant network including a ZIGBEE® specification-compliant coordinator, a plurality of client devices, and at least one server device, the method comprising:
  receiving, from the client device, client profile information for the client device, and receiving a request for an assignment of an IP address;
  determining an IP address to be assigned to the client device; and
  registering the received client profile information in a previously stored client list, and assigning the determined IP address to the client device.

15. The method of claim 14, wherein determining an IP address to be assigned to the client device comprises:
  determining whether an IP address included in the received client profile information is null data;
  when the IP address included in the client profile information is null data, determining an arbitrary IP address to be assigned to the client device;
  when the IP address included in the client profile information is not null data, determining whether an IP assignment to the client device is possible;
  when an IP assignment to the client device is possible, determining an IP address for the client device; and
  when IP assignment to the client device is not possible, rejecting assignment of an IP address to the client device.

16. The method of claim 14, wherein assigning the determined IP address to the client device comprises:
  generating a timer corresponding to the client device using the received client profile information;
  recording information on the timer in the client profile information;
  registering, in the client list, the client profile information in which the information on the timer is recorded; and
  assigning the determined IP address to the client device.

17. The method of claim 16, further comprising:
  when the IP address is assigned to the client device, starting the generated timer.

18. The method of claim 14, wherein the client profile information comprises at least one of a Personal Area Network IDentifier (PAN ID), a ZIGBEE® specification-compliant address, an IP address, a Device Mode, a Timer Handle and an Expire Time for the client device.

19. A client device in a ZIGBEE® specification-compliant network including a ZIGBEE® specification-compliant coordinator, a plurality of client devices, and at least one server device, in which the client device is assigned an Internet Protocol (IP) address, the client device comprising:
  a memory for storing client profile information, and storing a server address list or server profile information received from the ZIGBEE® specification-compliant coordinator; and
  a controller for entering a ZIGBEE® specification-compliant network formed by the ZIGBEE® specification-compliant coordinator, sending a join request to the ZIGBEE® specification-compliant coordinator, sending a request for a server address list to the ZIGBEE® specification-compliant coordinator after joining the ZIGBEE® specification-compliant network, receiving a server address list from the ZIGBEE® specification-compliant coordinator, accessing one of server devices registered in the server address list, sending an IP address request message to the accessed server device, and receiving an IP address assigned from the server device.

20. A ZIGBEE® specification-compliant coordinator for assigning an Internet Protocol (IP) address to a client device in a ZIGBEE® specification-compliant network including the ZIGBEE® specification-compliant coordinator, a plurality of client devices, and at least one server device, the ZIGBEE® specification-compliant coordinator comprising:
  a memory for storing a server list, which is a list of server devices that have joined the ZIGBEE® specification-compliant network, server profile information of the server devices, and a server address list including ZIGBEE® specification-compliant addresses of the server devices; and
  a controller for receiving, from a server device having at least one IP address, server profile information including server address information for the server device, registering the received server profile information in a previously stored server list, receiving, from the client device, a request for a server address list including a ZIGBEE® specification-compliant address of each server device, and transmitting the requested server address list to the client device.

21. The ZIGBEE® specification-compliant coordinator of claim 20, wherein in order to register the server profile information in a server list, the controller generates a timer for the server device, records information on the generated timer in the server profile information, transmits the server profile information to the server device, and registers the transmitted server profile information in the server list.

22. The ZIGBEE® specification-compliant coordinator of claim 21, wherein the timer for the server device is a valid time for which the server device can provider a service in the ZIGBEE® specification-compliant network.

23. The ZIGBEE® specification-compliant coordinator of claim 20, wherein the ZIGBEE® specification-compliant coordinator receives client profile information from the client device, determines server devices that can assign an IP address to the client device using the client profile information, extracts ZIGBEE® specification-compliant addresses using server profile information for the determined server devices, generates a server address list using the extracted ZIGBEE® specification-compliant addresses, and transmits the generated server address list to the client device.

24. The ZIGBEE® specification-compliant coordinator of claim 20, wherein the server profile information comprises at least one of a Personal Area Network IDentifier (PAN ID), a ZIGBEE® specification-compliant address, an IP address, a Device Mode, a Timer Handle, and an Expire Time for the server device, and the client profile information comprises at least one of a PAN ID, a ZIGBEE® specification-compliant address, an IP address, a Device Mode, a Timer Handle and an Expire Time for the client device.

25. A server device for assigning an Internet Protocol (IP) address in a ZIGBEE® specification-compliant network including a ZIGBEE® specification-compliant coordinator, a plurality of client devices, and at least one server device, the server device comprising:
  a memory for storing server profile information of the server device, and client profile information for a client device requesting an assignment of an IP address; and
  a controller for receiving, from the client device requesting assignment of an IP address, client profile information for the client device, determining an IP address to be assigned to the client device using the received client profile information, recording the client profile information in a previously stored client list, and assigning the determined IP address to the client device.

26. The server device of claim 25, wherein the controller generates a timer for the client device, records information on the generated timer in the client profile information, and stores the client profile information in the client list.

27. The server device of claim 26, wherein the timer for the client device is information on a valid time for which the client device can transmit and receive data using an IP address assigned from the server device.

* * * * *